United States Patent
Yamashita et al.

(10) Patent No.: US 6,411,446 B1
(45) Date of Patent: Jun. 25, 2002

(54) DEVICE FOR SECURING OPTICAL ELEMENT

(75) Inventors: Tatsumaro Yamashita; Toshihiro Sakurai, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/619,149

(22) Filed: Jul. 19, 2000

(30) Foreign Application Priority Data

Jul. 19, 1999 (JP) .......................................... 11-204456

(51) Int. Cl.$^7$ ................................................. G02B 7/02
(52) U.S. Cl. ...................................................... 359/819
(58) Field of Search ................................. 359/808, 819, 359/822, 823

(56) References Cited

U.S. PATENT DOCUMENTS

| | | | | |
|---|---|---|---|---|
| 3,829,201 A | * | 8/1974 | Whiting | ...................... 351/154 |
| 4,962,999 A | | 10/1990 | Kasuga | ........................ 359/896 |
| 5,814,807 A | * | 9/1998 | Musha | ...................... 250/201.5 |
| 6,137,121 A | * | 10/2000 | Yamamoto | .................... 257/80 |

* cited by examiner

Primary Examiner—Georgia Epps
Assistant Examiner—Gary O'Neill
(74) Attorney, Agent, or Firm—Brinks Hofer Gilson & Lione

(57) ABSTRACT

A device for securing an optical element in which, when an opposing surface of a mold for forming a base is formed so that a mounting surface of the base is formed at an angle equal to 90 degrees plus a very small angle, the mounting surface is smoothly formed when the mold is removed from the base. Therefore, it becomes unnecessary to mechanically cut the mounting surface, so that it can serve as a reference surface for directly securing the optical element thereto. This makes it possible to simplify the manufacturing process of the base and to reduce costs.

14 Claims, 3 Drawing Sheets

FIG. 1A
FIG. 1B
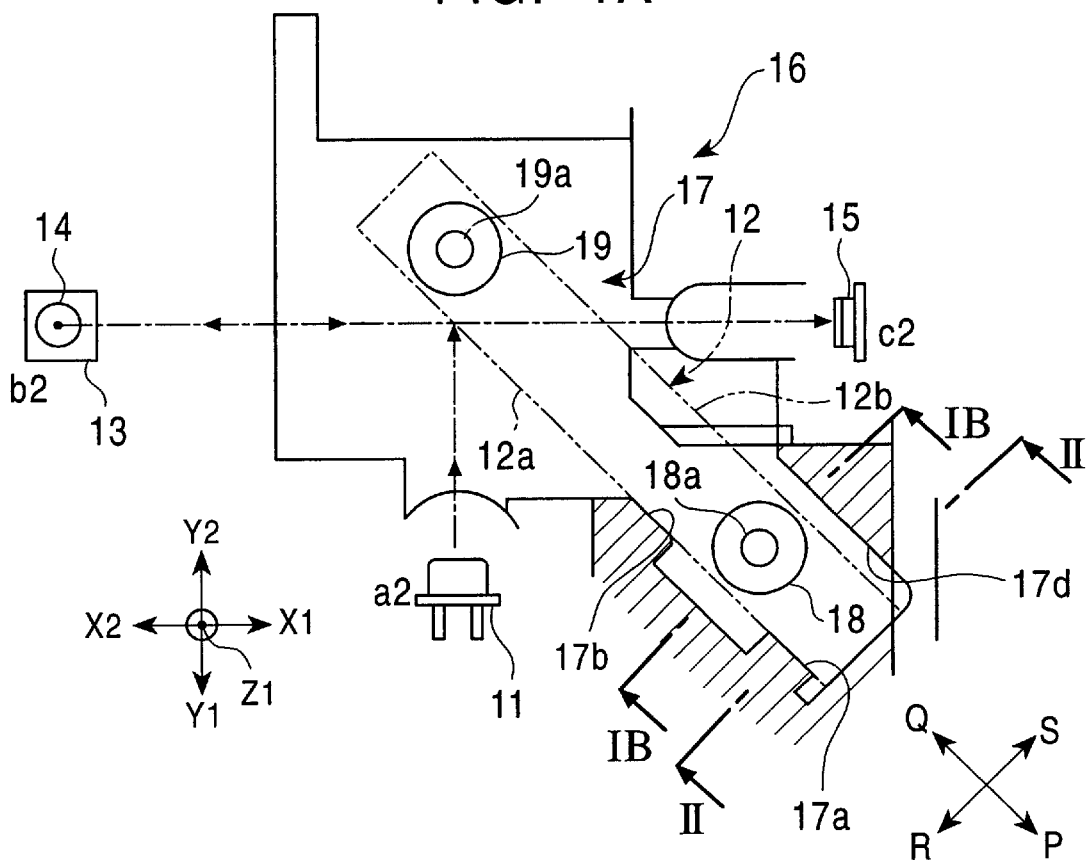
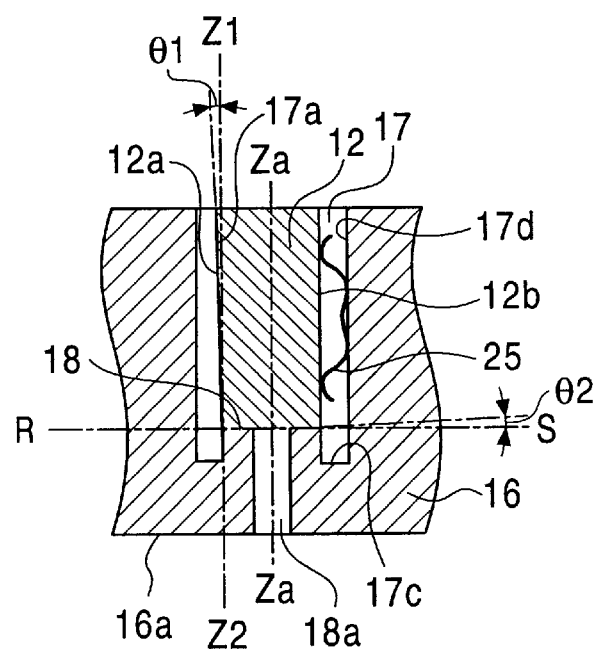

DEVICE FOR SECURING OPTICAL ELEMENT

BACKGROUND OF THE INVENTION

1. Field of the Invention

The present invention relates to a device for securing an optical element, such as a beam splitter, installed in an optical pick-up device and, more particularly, to a device for securing an optical element to a securing section in an optical pick-up device with high precision.

2. Description of the Related Art

FIG. 4 schematically illustrates the internal structure of a conventional optical pick-up device. FIG. 5 is a sectional view of the inside of a base (i.e., a carriage) in which the conventional optical element is secured.

Referring to these figures, the conventional optical pick-up device comprises a laser diode 1 which emits a laser beam, an optical element 2, a reflecting mirror 3, an objective lens 4, and a light detector 5. These component parts are installed on a base (not shown) of the optical pick-up device in the positional relationship shown in FIG. 4. The laser beam irradiated from the laser diode 1 is incident on a side surface (that is, an incident surface) 2a of the optical element 2 at a predetermined angle of incidence. The optical element 2 may be, for example, a polarization beam splitter or a half mirror which can divide the incident light beam into two types of light beams, (i.e., a reflected light beam and a transmitted light beam). A portion of the light beam is reflected by the side surface 2a of the optical element 2 towards the reflecting mirror 3. The objective lens 4 is disposed above the reflecting mirror 3. The reflecting mirror 3 is inclined by a predetermined angle in the optical pick-up device in order to guide the reflected laser beam to the objective lens 4. A disk (not shown), such as a compact disk (CD) or a digital video disk (DVD), is mounted above the objective lens 4. By way of example, a focus-servo function (not illustrated) can be employed so that the objective lens 4 is capable of focusing the light beam reflected by the reflecting mirror 3 onto a signal-recording surface of the disk.

The returning light beam reflected from the signal-recording surface of the disk travels back to the optical element 2 by passing through the same path taken to reach the objective lens 4 in the opposite direction. Some of the returning light beam passes through the optical element 2, and is guided to the light detector 5 disposed behind the optical element 2. The light detector 5 may be, for example, a pin photodiode that detects the returning light beam that has passed through the optical element 2 in order to perform various signal processing operations thereon.

In the above-described optical pick-up device, the side surface 2a of the optical element 2 is an incident surface of the light beam from the laser diode 1 and a reflection surface which directs the light beam to the objective lens 4. Therefore, any tilting of the side surface 2a of the optical element 2 will effect, for example, the reading operation of the signal from the disk.

Therefore, when the optical element 2 is not precisely positioned at a predetermined location in the base of the optical pick-up device (i.e., when the side surface 2a is not oriented with high precision in a direction al where the laser diode 1 is disposed and in a direction b1 where the reflecting mirror 3 is disposed), then the center of the laser beam may get shifted from an optical axis $O_1$ of the objective lens 4. This may cause aberrations to increase such that, for example, the shape of the laser beam spot formed on the signal-recording surface of the disk is distorted.

When the optical element 2 shifts in position or gets tilted, an optical axis $O_2$ which extends to the light detector 5 gets shifted, resulting in problems such as the occurrence of offsetting in the focus-servo operation of the objective lens 4.

Conventionally, an attempt has been made to overcome this problem by, as shown in FIG. 5, forming a recess-shaped securing section 7 in a portion of a base 6, and securing the optical element 2 in the securing section 7. More specifically, conventional attempts have been made to overcome this problem by forming a bottom surface 7a of the securing section 7 parallel to a bottom surface 6a of the base 6, and by forming a mounting surface (i.e., a reference surface) 7b of the securing section 7 with high precision at an angle of 90 degrees from the bottom surface 7a of the securing section 7, or the bottom surface 6a of the base 6, in order to secure a portion of a surface of the optical element 2 to the mounting surface 7b in intimate contact therewith.

However, the base 6 is formed by die-casting a metal, such as aluminum or magnesium. Thus, the mold that is used to die-cast the metal must be removed from the base 6 in a direction perpendicular to the bottom surface 6a of the base 6 (i.e., in a direction parallel to the mounting surface 7b). When the mounting surface 7b is parallel to the direction in which the mold is removed, the mounting surface 7b and the mold rub against each other when the mold is removed, resulting in problems such as scratching and distortion of the mounting surface 7b.

Therefore, conventionally, it has been necessary to provide excess metal (that is, machining allowance) with a small thickness on the mounting surface 7b, and to finish the mounting surface 7b with high precision by mechanically cutting the excess metal (i.e., the machining allowance) after removing the mold from the base 6. This complicates the manufacturing process of the base 6, resulting in increased manufacturing costs.

SUMMARY OF THE INVENTION

To overcome the above-described conventional problem, it is an object of the present invention to provide a device for securing an optical element capable of preventing rubbing occurring as a result of mold releasing, and allowing a surface for positioning the optical element with high precision to be formed when a molding operation is completed.

To this end, according to the present invention, there is provided a device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, wherein:

the mounting surface is formed at an angle of 90 degrees plus a very small angle θ1 with respect to the surface of the base.

The very small angle θ1 may be greater than 0 degrees and equal to or less than 3 degrees.

In the present invention, by forming the mounting surface in the securing section of the base into an inclined surface, during removal of the base from the mold, the mounting surface of the base and the inclined molding surface of the mold can be properly separated from each other, so that, when a molding operation is completed, the mounting surface can be formed smoothly with high precision. Therefore, the mounting surface in a molded state can serve as a reference surface for securing the optical element, making it unnecessary to perform a mechanical cutting operation on the mounting surface after the removal of the base from the mold.

By providing a device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, and in which the mounting surface is formed at an angle of 90 degrees plus a very small angle θ1 with respect to the surface of the base, the base may include a bottom portion mounting surface formed at right angles to the mounting surface, the optical element may include a bottom surface formed at right angles to the reference optical surface, and the optical element may be positioned by bringing the reference optical surface into intimate contact with the mounting surface and by abutting the bottom surface against the bottom portion mounting surface.

By maintaining the mounting surface and the bottom portion mounting surface at right angles to each other, the optical element can be secured to the mounting surface with high precision. In other words, since the bottom surface and the reference optical surface of the optical element can be formed at right angles to each other with high precision, even if the mounting surface is inclined, the optical element can be secured in the securing section with high precision by setting the angle between the mounting surface and the bottom surface of the securing section at 90 degrees.

By providing a device for securing an optical element in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, and in which the mounting surface is formed at an angle of 90 degrees plus a very small angle θ1 with respect to the surface of the base, the optical element may be supported in a cantilever manner by bringing one end of the reference optical surface extending in a widthwise direction along the surface of the base into intimate contact with the mounting surface, while an optical axis crossing an area of the reference optical surface is not brought into intimate contact with the mounting surface.

In this structure, by holding only one end of the optical element in a cantilever manner when the optical element is being secured, the other end can serve as a free end. Thus, this structure can prevent problems produced when both ends of the optical element are secured, such as dimensional differences between the mounting surfaces to which both ends of the optical element are secured. Therefore, the problem of the optical element becoming deformed when both ends of the reference optical surface of the optical element are forcibly secured to the mounting surfaces due to the dimensional differences between the mounting surfaces can be prevented from occurring. Consequently, it is possible to orient with high precision the optical axis which crosses (or is incident on, is reflected by, or passes through) the reference optical surface (i.e., the incident surface) of the optical element.

By providing a device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, and in which the mounting surface is formed at an angle of 90 degrees plus a very small angle θ1 with respect to the surface of the base, the base may be molded of a metallic material, and the mounting surface may be mechanically processed.

BRIEF DESCRIPTION OF THE DRAWINGS

FIGS. 1A and 1B each illustrate a portion of a base (i.e., a carriage) of an optical pick-up device. More specifically, FIG. 1A is a plan view primarily showing a securing section, and FIG. 1B is a sectional view taken along line 1B—1B of FIG. 1A.

DESCRIPTION OF THE PREFERRED EMBODIMENT

Hereunder, a description of the present invention will be given with reference to the drawings.

Figure 2:
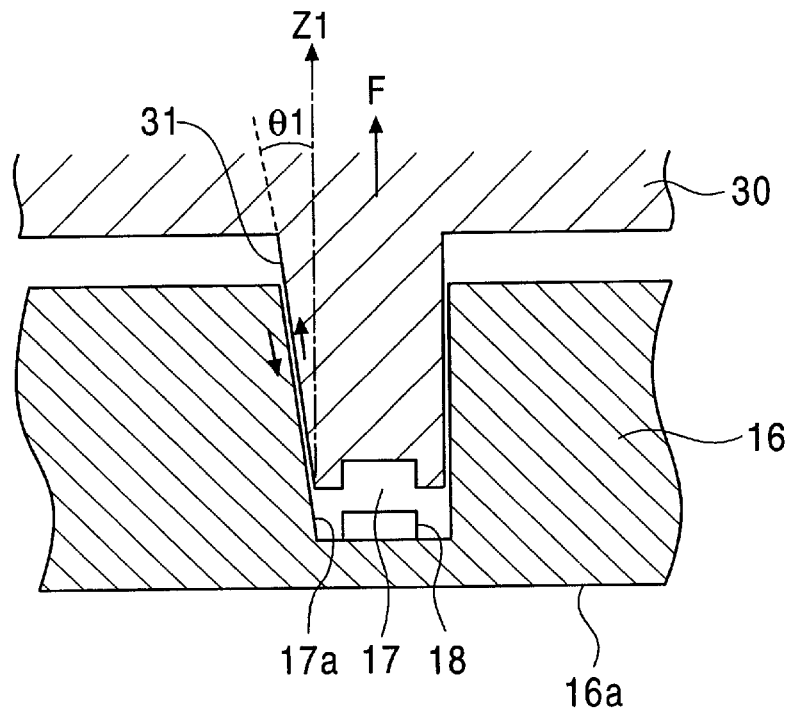
FIG. 2 is a sectional view taken along line II—II of FIG. 1A, illustrating the relationship between the securing section and a mold.
Figure 3:
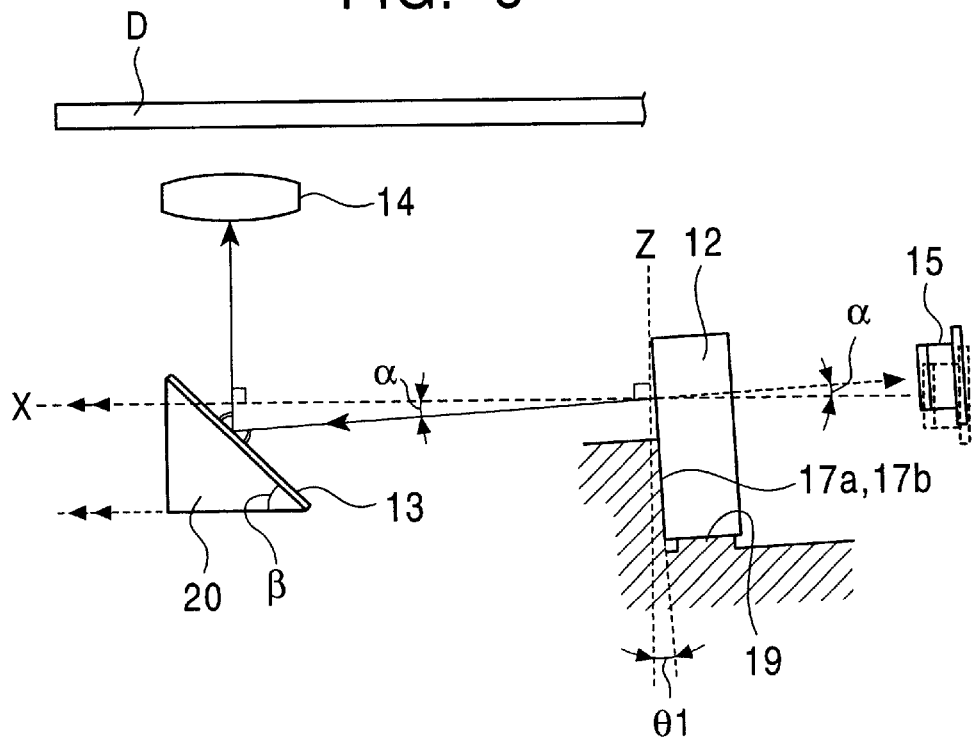
FIG. 3 is a side view illustrating the relationship between an optical element and a reflecting mirror.
Figure 4:
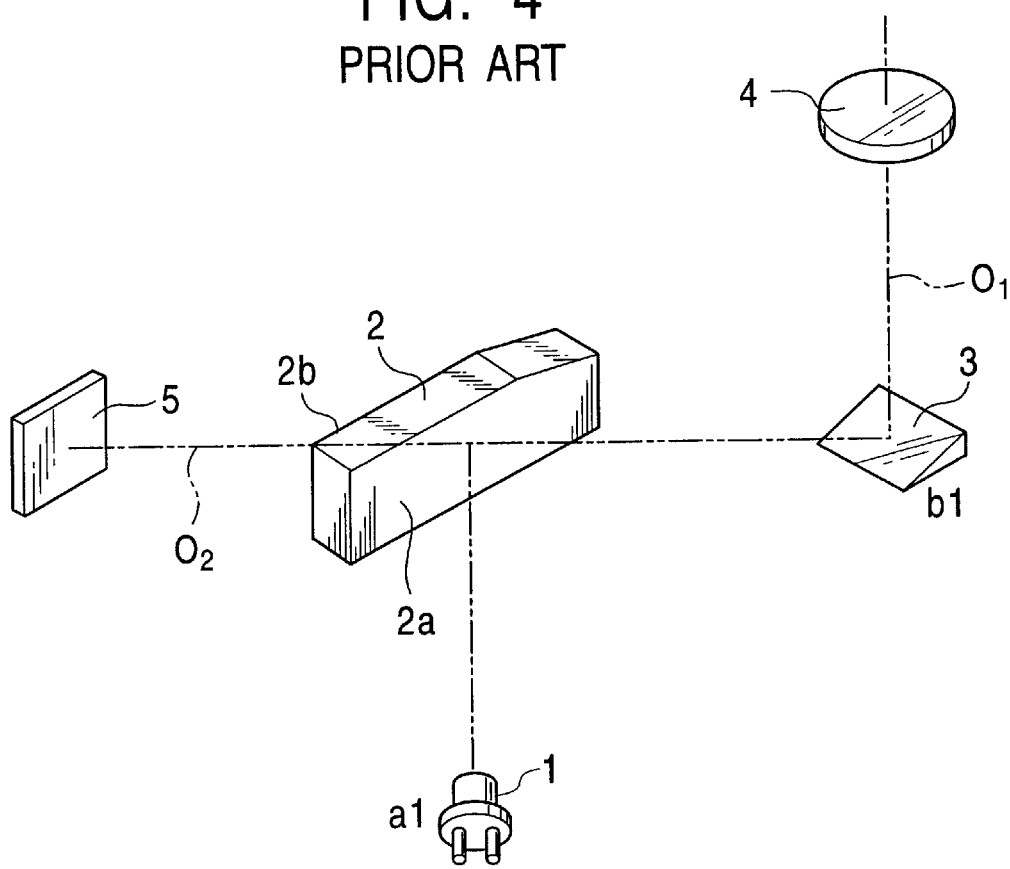
FIG. 4 schematically illustrates the internal structure of a conventional optical pick-up device.
Figure 5:
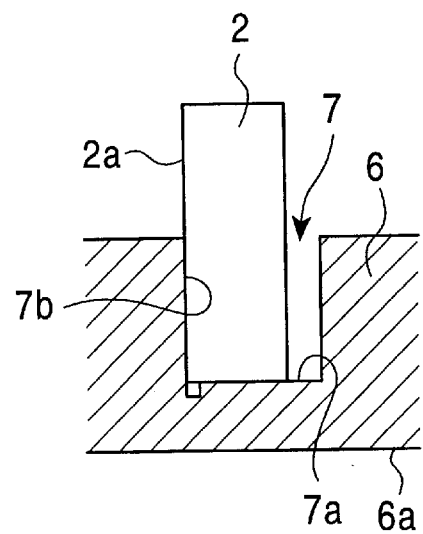
FIG. 5 is a sectional view illustrating the inside of a base (i.e., a carriage) in which a conventional optical element is secured.

FIGS. 1A and 1B each illustrate a portion of a base (i.e., a carriage) of an optical pick-up device. More specifically, FIG. 1A is a plan view primarily showing a securing section, and FIG. 1B is a sectional view taken along line 1B—1B of FIG. 1A. FIG. 2 is a sectional view taken along line II—II of FIG. 1A, showing the relationship between the securing section and a mold. FIG. 3 is a side view showing the relationship between an optical element and a reflecting mirror in the base.

An optical pick-up device for recording data onto and reading data from a disk is installed in various disk devices, such as a compact disk (CD) player, a digital video disk (DVD) player, or a mini-disk (MD) player. The optical pick-up device is disposed so as to be movable with respect to a disk on a turntable in a radial direction thereof.

In the optical pick-up device, a base 16, called a carriage, serves as a supporting base member, and a light-emitting element (i.e., a laser diode) 11, an optical element 12, a reflecting mirror 13, an objective lens 14, and a light detector 15 are mounted on the base 16.

As shown in FIGS. 1A and 1B, a securing section 17 which is a recess-shaped area in cross-section is formed in the base 16. The optical element 12, such as a half mirror or a polarization beam splitter, is provided in the securing section 17. Protruding cylindrical pedestals 18 and 19 are formed on a bottom surface (that is, a bottom portion mounting surface) 17c in the securing section 17. Through holes 18a and 19a are formed in the centers of the corresponding pedestals 18 and 19. Mounting surfaces 17a and 17b are formed adjacent to a side of the pedestal 18 in the direction of arrow R illustrated in FIG. 1A. The mounting surfaces 17a and 17b are both formed substantially perpendicular to the bottom surface 17c. More specifically, they are surfaces which are inclined from vertical planes corresponding thereto by very small angles θ1. As shown in FIG. 1B, the angles from the bottom portion mounting surface 17c are each equal to 90 degrees plus the very small angle θ1, wherein θ1 is preferably greater than 0 degrees and less than or equal to 3 degrees (that is, 0<θ1≦3 degrees).

Surfaces of the pedestals 18 and 19 are inclined slightly higher at corresponding S sides than at corresponding R sides. As shown in FIG. 1B, an inclination angle θ2 of each of the pedestals 18 and 19 from a horizontal axis (here, the R-S axis) is equal to its corresponding small angle θ1. Therefore, the angle between the mounting surface 17a and a surface (that is, a bottom portion mounting surface) of the pedestal 18, and the angle between the mounting surface 17b and a surface (that is, a bottom portion mounting surface) of the pedestal 19, are 90 degrees. In other words, the angles between lines extending at the corresponding very small angles θ1 and corresponding lines extending at the corresponding inclination angles θ2 are 90 degrees.

The light-emitting element 11, such as a laser diode, the reflecting mirror 13, the objective lens 14, and the light detector 15 are disposed at predetermined locations around the optical element 12 in the base 16. More specifically, in FIG. 1A, the light-emitting element 11 is disposed at a location a2 in the direction of arrow Y1 from the optical element 12, and the reflecting mirror 13 is disposed at a location b2 in the direction of arrow X2 in FIG. 1A. The light detector 15 is disposed at a location c2 in the direction of arrow X1 in FIG. 1A.

The base (or carriage) 16 of the optical pick-up device is formed by die-casting, for example, an alloy of aluminum. More specifically, it is formed by pouring molten aluminum into a mold (not shown), cooling it, and then removing the mold from the base 16.

As shown in FIG. 2, a bottom surface 16a of the base 16 is set perpendicular to a perpendicular axis (that is, the Z axis). The direction of arrow F in which a mold 30 is removed and a vertical direction Z1 are the same. By forming an opposing surface (an inclined mold surface) 31 of the mold 30 opposing the mounting surfaces 17a and 17b at an angle equal to 90 degrees plus the very small angle θ1 (formed from the vertical axis or the Z axis), the mounting surfaces 17a and 17b of the base 16 can be formed at the angle equal to 90 degrees plus the very small angle θ1.

As discussed above, the opposing surface 31 of the mold 30 and the mounting surfaces 17a and 17b of the securing section 17 of the base 16 oppose each other at the angle equal to 90 degrees plus the very small angle θ1. Therefore, by removing the mold 30 in the vertical direction Z1, it is possible to improve how well the mounting surfaces 17a and 17b of the securing section 17 and the opposing surface 31 of the mold 30 are separated from each other, so that, when the mold is released, the mounting surfaces 17a and 17b do not get scratched or distorted. Since, in the molding state, the mounting surfaces 17a and 17b can be smoothly formed, they can be formed as reference surfaces for positioning the optical element 12 in the securing section 17 without subjecting the mounting surfaces 17a and 17b to a cutting operation.

Accordingly, when the mounting surfaces 17a and 17b can be formed as reference surfaces for mounting the optical element 12, the optical element 12 can be directly secured to the mounting surfaces 17a and 17b after removing the mold 30. Therefore, unlike in a conventional manufacturing process, it is no longer necessary to mechanically cut the mounting surfaces 17a and 17b after removing the mold 30 in order to form them with higher precision. Consequently, the manufacturing process is simplified and manufacturing costs are reduced.

As shown in FIG. 1A, the optical element 12 which has a rectangular parallelepiped shape is disposed at the pedestals 18 and 19 of the securing section 17, with the directions of arrows P and Q in FIG. 1 being defined as longitudinal directions. The optical element 12 itself can be formed with high precision. By forming the angle between the bottom surface and an incident surface (that is, a reference optical surface) 12a of the optical element 12 to be equal to the angles between the surfaces (that is, the bottom portion mounting surfaces) of the pedestals 18 and 19 and their corresponding mounting surfaces 17a and 17b, the optical element 12 can be disposed with high precision in the securing section 17. (In the foregoing description, this angle is equal to 90 degree).

The optical element 12 may be secured in the securing section 17 by methods described below. In one method, it is achieved by bonding the bottom surface of the optical element 12 to the bottom portion mounting surfaces of the pedestals 18 and 19 by, for example, pouring adhesive into the through holes 18a and 19a from outside the base 16. In another method, it is achieved by sandwiching a resilient member 25, such as a plate spring, between a wall 17d of the securing section 17 and an exiting surface 12b of the optical element 12, and pushing a portion of the incident surface (that is, the reference optical surface) 12a of the optical element 12 against the mounting surfaces 17a and 17b disposed in the direction of arrow R (see FIG. 1B) in order to position it. In still another method, it is achieved by using adhesive and the resilient member 25 in combination.

At the base 16, only one end (that is, the end situated at the P side) of the optical element 12 is supported and secured in a cantilever manner, with the two mounting surfaces 17a and 17b acting as reference surfaces. The other end (that is, the end situated at the Q side) of the optical element 12 is secured to the pedestal 19 only with adhesive. In other words, the Q-side end of the optical element 12 is defined as a free end, and only the P-side end of the optical element 12 is pushed against and secured to the mounting surfaces 17a and 17b. Thereafter, the bottom surface of the Q-side end of the optical element 12 and the pedestal 19 are secured together with adhesive. Accordingly, since the P-side end and the Q-side end of the optical element 12 are not forcibly secured to the mounting surfaces 17a and 17b, excess force is not applied to the optical element 12. Consequently, it is possible to prevent the incident surface 12a and the exiting surface 12b of the optical element 12 from getting deformed, such as from becoming warped or twisted. Since it is possible to prevent deformation of the surfaces 12a and 12b of the optical element 12, the optical axis of a laser beam which crosses (that is, falls upon, is reflected by, or passes through) the optical element 12 can be directed towards a predetermined direction with high precision.

In the structure shown in FIG. 1A, the laser beam emitted from the light-emitting element 11 exits therefrom in the direction of arrow Y2, and is obliquely incident on the incident surface (that is, the reference optical surface) 12a of the optical element 12 at an angle of 45 degrees. Then, the laser beam is reflected by the incident surface 12a towards the reflecting mirror 13 disposed at the location b2. At the reflecting mirror 13, the direction of propagation of the laser beam is set in the vertical direction Z1, so that the laser beam is guided towards the objective lens 14 disposed above the reflective lens 13, and, then, to a signal-recording surface of a disk D.

The light beam returning from the signal-recording surface is guided back to the optical element 12 by passing through the same path taken to reach the objective lens 14 in the opposite direction. Then, some of the returning light beam passes through the optical element 12, and is guided to the light detector 15, such as a pin photodiode, disposed at the location c2 behind the reflective surface 12b of the optical element 12 in the direction of arrow X1. The light detector 15 converts a light signal produced by the returning light beam into an electrical signal, which is subjected to various signal processing operations in a signal-processing means (not shown).

As shown in FIG. 3, the optical element 12 is secured to the mounting surfaces 17a and 17b at an angle equal to 90 degrees plus the very small angle θ1, or at the very small angle θ1 from the vertical Z axis. Therefore, the direction of propagation of the laser beam after reflection by the optical element 12 is not parallel to the horizontal X axis. It is slightly tilted downward by an angle α.

In order to direct the laser beam after reflection by the reflecting mirror 13 in the direction of the center of the objective lens 14, a supporting base 20 disposed adjacent to the base 16 for previously mounting the reflecting mirror 13 thereto is set at an inclination angle β from the horizontal axis, or from a surface of the base 16 such as the bottom surface 16a thereof parallel to the horizontal axis. This makes it possible to correct any shifting of the light beam from the direction of the center of the objective lens 14. The optical axis of the returning light beam that has passed through the optical element 12 is set at the angle a from the horizontal axis X. The optical axis of the returning light beam can be previously set so that the light detector 15 is disposed thereon, making it possible to reliably detect the returning light beam. By previously setting the mold at a predetermined angle, the supporting base 20 can be integrally formed with the mounting surfaces 17a and 17b.

There may also be used a structure in which an exiting angle from the light-emitting element 12 (that is, the angle of incidence of the light beam with respect to the optical element 12) is previously adjusted so that the light beam reflected by the optical element 12 is parallel to the horizontal axis X. In this case, the laser beam reflected by the reflecting mirror 13 can be directed in the direction of the center of the objective lens 14 (that is, in the Y-axis direction) by setting the inclination angle β of the reflecting mirror at 45 degrees from the horizontal axis.

According to the present invention described in detail above, it is possible to more properly release the mounting surfaces for mounting the optical element 12 in the base (that is, the carriage) and the mold from each other, so that the mounting surfaces can be smoothly formed with high precision in the molding state.

In addition, since the mounting surfaces can be smoothly formed when the mold is removed from the base, it becomes unnecessary to carry out a mechanical cutting operation, so that manufacturing costs can be reduced.

What is claimed is:

1. A device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, wherein:
the mounting surface is formed at an angle of 90 degrees plus a very small angle θ1 of 0°<θ1 3° with respect to the surface of the base.

2. A device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other,
wherein the base includes a bottom portion mounting surface formed at right angles to the mounting surface, wherein the optical element includes a bottom surface formed at right angles to the reference optical surface, and wherein the optical element is positioned by bringing the reference optical surface into intimate contact with the mounting surface, and by abutting the bottom surface against the bottom portion mounting surface, and wherein the mounting surface is formed at an angle of 90 degrees plus a very small angle θ1 with respect to the surface of the base.

3. A device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, wherein the optical element is supported in a cantilever manner by bringing one end of the reference optical surface extending in a widthwise direction along the surface of the base into intimate contact with the mounting surface, while an optical axis crossing an area of the reference optical surface is not brought into intimate contact with the mounting surface, and wherein the mounting surface is formed at an angle of 90 degrees plus a very small angle θ1 with respect to the surface of the base.

4. A device for securing an optical element, in which a base includes a mounting surface formed substantially perpendicular to a surface of the base, and an optical element with a reference optical surface serving as a light-reflecting surface, a light-incident surface, or a light-exiting surface is positioned by bringing the reference optical surface and the mounting surface into intimate contact with each other, wherein the base is molded of a metallic material, wherein the mounting surface is mechanically processed and wherein the mounting surface is formed at an angle of 90 degrees plus a very small angle θ1 with respect to the surface of the base.

5. A device for securing an optical element according to claim 2, wherein the very small angle θ1 is 0°<θ1 3°.

6. A device for securing an optical element according to claim 3, wherein the very small angle θ1 is 0°<θ1 3°.

7. A device for securing an optical element according to claim 4, wherein the very small angle θ1 is 0°<θ1 3°.

8. A device for securing an optical element according to claim 3, wherein the base includes a bottom portion mounting surface formed at right angles to the mounting surface, wherein the optical element includes a bottom surface formed at right angles to the reference optical surface, and wherein the optical element is positioned by bringing the reference optical surface into intimate contact with the mounting surface and by abutting the bottom surface against the bottom portion mounting surface.

9. A device for securing an optical element according to claim 4, wherein the base includes a bottom portion mounting surface formed at right angles to the mounting surface, wherein the optical element includes a bottom surface formed at right angles to the reference optical surface, and wherein the optical element is positioned by bringing the reference optical surface into intimate contact with the mounting surface and by abutting the bottom surface against the bottom portion mounting surface.

10. A device for securing an optical element according to claim 4, wherein the optical element is supported in a cantilever manner by bringing one end of the reference optical surface extending in a widthwise direction along the surface of the base into intimate contact with the mounting surface, while an optical axis crossing an area of the reference optical surface is not brought into intimate contact with the mounting surface.

11. A device for securing an optical element according to claim 5, wherein the optical element is supported in a cantilever manner by bringing one end of the reference optical surface extending in a widthwise direction along the surface of the base into intimate contact with the mounting surface, while an optical axis crossing an area of the reference optical surface is not brought into intimate contact with the mounting surface.

12. A device for securing an optical element according to claim 5, wherein the base is molded of a metallic material and wherein the mounting surface is mechanically processed.

13. A device for securing an optical element according to claim 6, wherein the base is molded of a metallic material and wherein the mounting surface is mechanically processed.

14. A device for securing an optical element according to claim 11, wherein the base is molded of a metallic material and wherein the mounting surface is mechanically processed.

* * * * *